United States Patent [19]

Petty, Jr.

[11] Patent Number: 4,723,120

[45] Date of Patent: Feb. 2, 1988

[54] METHOD AND APPARATUS FOR CONSTRUCTING AND OPERATING MULTIPOINT COMMUNICATION NETWORKS UTILIZING POINT-TO POINT HARDWARE AND INTERFACES

[75] Inventor: John S. Petty, Jr., Durham, N.C.

[73] Assignee: International Business Machines Corporation, Armonk, N.Y.

[21] Appl. No.: 818,632

[22] Filed: Jan. 14, 1986

[51] Int. Cl.$^4$ ............................................. H04Q 11/00
[52] U.S. Cl. ................................ 340/825.020; 370/14; 375/10; 340/825.52
[58] Field of Search ...................... 340/825.02, 825.05, 340/825.52; 370/13-15, 86; 375/10

[56] References Cited

U.S. PATENT DOCUMENTS

| | | | |
|---|---|---|---|
| 4,201,890 | 5/1980 | Lawrence et al. | 370/86 |
| 4,413,259 | 11/1983 | Lutz et al. | 340/825.06 |
| 4,498,186 | 2/1985 | Hwang et al. | 375/10 |
| 4,542,507 | 9/1985 | Read | 370/13 |
| 4,593,154 | 6/1986 | Takeda et al. | 370/86 |

*Primary Examiner*—Donald J. Yusko
*Attorney, Agent, or Firm*—Edward H. Duffield

[57] ABSTRACT

The invention permits multiple secondary stations to be connected in a multipoint communication network to a single primary station utilizing point-to-point interfaces such as the standard RS-232 or V.35 which do not ordinarily support multipoint connections. A primary station is connected to one secondary station or modem through a point-to-point interface utilizing either a straight through or cross over cable depending upon whether a modem is included. Data goes through the secondary station or modem to a second interface which is connected to a different secondary station or modem. This type of connection is referred to as a daisy chain. Data is not buffered in the secondary stations but is transmitted directly through each station. Each station monitors the daisy chain signals for clocking, status and identification of data for itself. Since there is no buffering, only a single set of clocking can be used in the chain. The invention allows the individual station to choose the method of clocking to be used throughout the chain without loss of synchronization between data and clocking. When modems are installed in the chain, they provide clocking and status signals. When no modems are installed, the primary station or one secondary station must provide the clocking and status signals. If the primary station fails to provide clocking, the secondary station at the end of the daisy chain provides the clocking and wraps back status signals using a simple logic network. The chain is self-adjusting to changes in topology and to additions and deletions of modems and/or secondary stations.

7 Claims, 19 Drawing Figures

FIG. 3

| PRIMARY STATION: | NO MODEMS IN CHAIN | MODEMS IN CHAIN |
|---|---|---|
| 1. RAISES DTR | DTR SIGNAL PROPA-GATES DOWN CHAIN, IS WRAPPED BACK BY LAST GUY, AND RETURNS TO PRIMARY STATION AS DSR. | DTR PROPAGATES DOWN TO MODEM. NORMAL DSR IS SENT FROM MODEM UP TO PRIMARY STATION. |
| 2. RECEIVES DSR | | |
| 3. RAISES RTS | RTS PROPAGATES DOWN CHAIN, IS WRAPPED BACK AT 'LAST GUY' AND RETURNS TO PRIMARY AS CTS TO PRIMARY. | RTS GETS DOWN TO MODEM. MODEM GIVES CTS WHEN READY. CTS GOES UP THE CHAIN TO PRIMARY STATION. |
| 4. RECEIVES CTS | | |
| 5. SENDS OUT DATA (AFTER GETTING CTS) | DATA PROPAGATES DOWN CHAIN TO END. | DATA PROPAGATES DOWN CHAIN THROUGH MODEMS TO END(S) OF CHAIN. |

FIG. 4

| SECONDARY STATION: | NO MODEMS IN CHAIN | MODEMS IN CHAIN |
|---|---|---|
| 1. RAISES RTS | RTS IS PROPAGATED UP THE DAISY CHAIN TO THE PRIMARY STATION WHERE IT APPEARS AS CD, PRIMARY RAISES DTR | RTS PROPAGATED UP TO MODEM. |
| 2. WAITS FOR CTS (DTR=CTS FOR SECONDARY) | DTR FROM THE PRIMARY IS CONNECTED TO THE SECONDARY'S CTS PIN. | MODEM GIVES BACK CTS WHICH PASSES DOWN THE DAISY CHAIN TO THE SECONDARY STATION. |
| 3. SENDS OUT DATA | DATA PROPAGATES UP CHAIN TO PRIMARY STATION. | DATA PROPAGATES UP CHAIN THROUGH MODEMS TO PRIMARY. |

FIG. 5

| SIGNAL | ARRIVES ON UPSTREAM PIN | LEAVES ON DOWNSTREAM PIN |
|---|---|---|
| DATA FROM PRIMARY STATION | 3 | 2 |
| DATA TERMINAL READY / CLEAR TO SEND | 5 | 20 |
| REQUEST TO SEND / CARRIER DETECT | 8 | 4 |
| CLOCK TO SEND DATA 'UPWARD' | 15 | 16 |
| CLOCK TO SEND DATA 'DOWNWARD' | 17 | 24 |
| RATE SELECT / RING INDICATE | 22 | 23 |
| TEST INDICATE / TEST CONTROL | 25 | 18 |

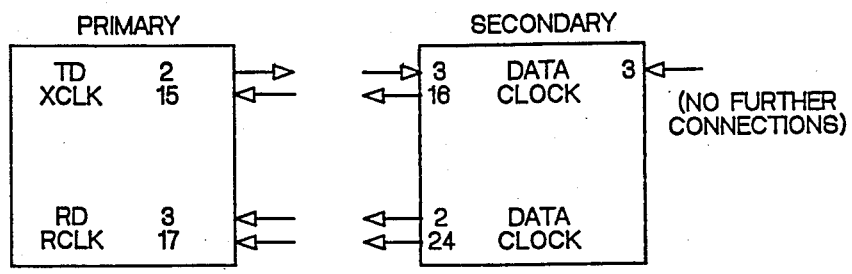
FIG. 11   CASE 1
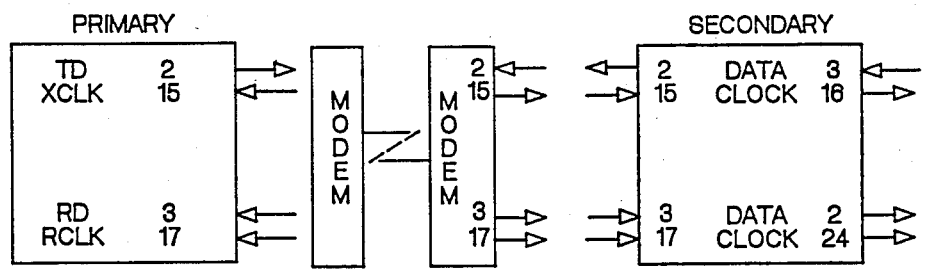
FIG. 12   CASE 2
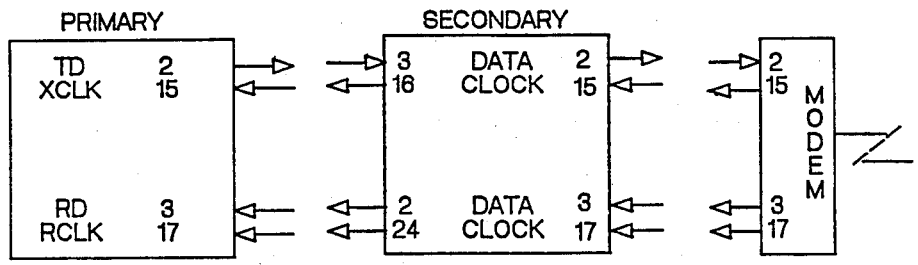
FIG. 13   CASE 3

FIG. 14 CASE 4
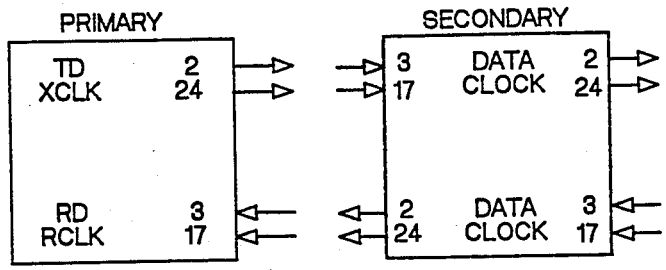
FIG. 15 CASE 5
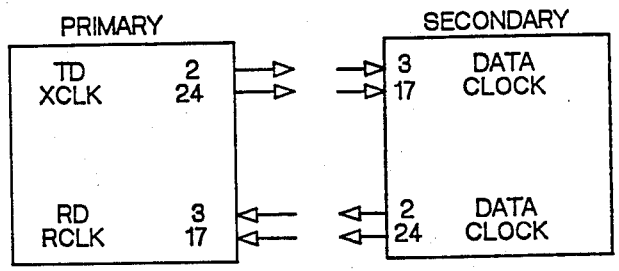
FIG. 16
SENSED BY SECONDARY STATION
INCOMING CLOCKS
0 = ACTIVE CLOCK
1 = INACTIVE CLOCK
DOWNSTREAM POWER OFF
0 = NOT 'LAST GUY'
1 = 'LAST GUY'
x = DON'T CARE      CLOCKING CASE
| UP15 | UP17 | DN15 | DN17 |   |   |
|------|------|------|------|---|---|
| 1    | 1    | 1    | 1    | 1 | 1 |
| 0    | 0    | 1    | 1    | X | 2 |
| 1    | 1    | 0    | 0    | X | 3 |
| 1    | 0    | 1    | 0    | 0 | 4 |
| 1    | 0    | 1    | 1    | 1 | 5 |

FIG. 17

| ADDRESS | SHORT NAME | DESCRIPTION |
|---|---|---|
| MSB　　　　　　　LSB | | |
| 000X XXX0 0000 0000 | ERAM | 256 BYTES OF EXTERNAL RAM |
| 000X XXX0 FFFF FFFF | | |
| 000X XXX1 XXXX X000 | 8155 CMD | OUTPUT PORT TO SET UP PA, PB, PC AND TIMER |
| 000X XXX1 XXXX X000 | 8155 STS | INPUT PORT TO READ 8155 STATUS |
| 000X XXX1 XXXX X001 | PA | INPUT PORT TO READ DAISY CHAIN INTERF. |

```
                    PA.0        TIMER OUTPUT FROM 8155 PIN 6
                                  SIDE        PIN
                    PA.1        UPSTREAM    11 SS    0=ACTIVE 1=INACTIVE
                    PA.2        UPSTREAM    22 RI    0=ACTIVE 1=INACTIVE
                *   PA.3        UPSTREAM    17 RCLK  DATA STABLE 0 TO 1
                *   PA.4        UPSTREAM    15 XCLK  DATA STABLE 0 TO 1
                *   PA.5        DWNSTREAM   17 RCLK  DATA STABLE 0 TO 1
                *   PA.6        DWNSTREAM   15 XCLK  DATA STABLE 0 TO 1
                *   PA.7        DWNSTREAM    3 POD   0=NO POD 1=PWR OFF
```

| 000X XXX1 XXXX X010 | PB | OUTPUT PORT TO CONTROL DAISY CHAIN |
|---|---|---|

```
                    PB.0        LED DRIVER             1=LED ON
                *   PB.1        CLOCKING CONTROL.  SEE TABLE BELOW.
                    PB.2        0=NVRAM STORE (100 NS MIN) 1=NORMAL
                    PB.3        0=DTR ACTIVE           1=DTR INACTIVE
                    PB.4        0=DTR SOURCE PB.3      1=EXTERNAL SOURCE
                *   PB.5        CLOCKING CONTROL.  SEE TABLE BELOW.
                    PB.6        0=PIN 11 ACTIVE        1=INACTIVE
                *   PB.7        0="LAST GUY" WRAPS INACT.   1=ACTIVE
```

| 000X XXX1 XXXX X011 | PC | INPUT PORT TO READ MISCELLANEOUS |
|---|---|---|

```
                    PC.0        0=BYPASS RELAY ON CARD  1=NOT ON CARD
                *   PC.1        0=NO POD AT DN08    1=POWER OFF
                    PC.2        0=U04 AT -6V (CD/RTS) 1=U04 'ON'
                    PC.3        SENSE COMMAND STABLE FROM BUS
                    PC.4        SENSE ADDRESS STABLE FROM BUS
                    PC.5        SENSE WATCHDOG OSCILLATOR
```

| 000X XXX1 XXXX X100 | LTIME | OUTPUT PORT FOR LOW ORDER TIMER |
| 000X XXX1 XXXX X101 | HTIME | OUTPUT PORT FOR TIMER HIGH, MODE |

*USED TO CONTROL CLOCKING ON THE DAISY CHAIN

FIG. 18

SENSED BY SECONDARY STATION

INCOMING CLOCKS
0 = ACTIVE CLOCK (TOGGLING)
1 = INACTIVE CLOCK

| UP15 | UP17 | DN15 | DN17 | CLOCKING CASE |
|------|------|------|------|---------------|
| 0 | 0 | 0 | 0 | 2 |
| 0 | 0 | 0 | 1 | 2 |
| 0 | 0 | 1 | 0 | 2 |
| 0 | 0 | 1 | 1 | 2 |
| 0 | 1 | 0 | 0 | 3 |
| 0 | 1 | 0 | 1 | 1 |
| 0 | 1 | 1 | 0 | 1 |
| 0 | 1 | 1 | 1 | 1 |
| 1 | 0 | 0 | 0 | 4 |
| 1 | 0 | 0 | 1 | 5 |
| 1 | 0 | 1 | 0 | 4 |
| 1 | 0 | 1 | 1 | 5 |
| 1 | 1 | 0 | 0 | 3 |
| 1 | 1 | 0 | 1 | 1 |
| 1 | 1 | 1 | 0 | 1 |
| 1 | 1 | 1 | 1 | 1 |

FIG. 19

INPUTS ('X'=DON'T CARE)

| CLOCK CASE | DOWNSTREAM POD, POD2 1=PWR LOSS BOTH | U11 0=ACTIVE | U25 0=ACTIVE | PB1 | PB5 | PB7 | U16 | U24 | 8044 RCV | CLOCK XMIT |
|---|---|---|---|---|---|---|---|---|---|---|
| 1 | X | 1 | X | 1 | 0 | 1 | I | I | U16 | U24 |
| 2 | X | 1 | X | 0 | 1 | 0 | D15 | D17 | U17 | U15 |
| 3 | 0 | 1 | X | 1 | 1 | 0 | D15 | D17 | U16 | U24 |
| 3 | 1 | 1 | X | 1 | 0 | 1 | I | I | U16 | U24 |
| 4 | 0 | 1 | X | 0 | 0 | 0 | I | D17 | U17 | U24 |
| 4 | 1 | 1 | X | 0 | 0 | 1 | I | D17 | U17 | U24 |
| 5 | X | 1 | X | 0 | 0 | 1 | I | D17 | U17 | U24 |
| X | X | 0 | X | 1 | 0 | 0 | I | I | U16 | U24 |

METHOD AND APPARATUS FOR CONSTRUCTING AND OPERATING MULTIPOINT COMMUNICATION NETWORKS UTILIZING POINT-TO POINT HARDWARE AND INTERFACES

FIELD OF THE INVENTION

This invention relates to communication networks and devices in general and in particular to the point-to-point interface hardware and apparatus that have standardized interfaces such as the RS232 or V.35 or the like which are intended for point-to-point interface connection. The invention particularly relates to a method of utilizing point-to-point interface connections to construct a multipoint network.

PRIOR ART

Many methods of connecting multiple secondaries to a single primary station are utilized. However, when only a point-to-point interface such as RS232 is allowed, the ordinary network connection uses a star configuration such as shown in FIG. 1. With a star configuration, any failures outside of the primary station cut off only a single secondary station but the primary station has an upper limit to the number of secondary stations that can be supported. The number of physical ports on the primary may soon become exhausted. Also, for many environments, the star configuration uses an excessive amount of cabling. Additionally, the cost of the primary station includes at least a portion of the cost of supporting the primary station's maximum number of secondary stations. This makes the cost of the primary station uneconomical for any user who does not use the maximum number of secondary stations, i.e., the user pays for the full complement of capability at the primary station whether it is used or not.

Another way to connect multiple secondary stations to a primary station is to construct a daisy chain configuration. A daisy chain configuration can use much less cable than a star layout and it is easier to add units to a daisy chain than to a star system. Also, the daisy chain does not require a relatively expensive primary unit with unused interfaces or ports, i.e., a customer pays for an interface only when it is needed. However, in a daisy chain, if a unit fails, more than one secondary station may be cut off from contact with the primary station. The cost of such a chain can be high, however, since chaining a number of RS232 interfaces together requires that the secondary station examine data and, if that station is not addressed, to pass the data on to another station. This means that each station must have processing capability and a full message length buffer capability to store the full message or at least a substantial portion of it until the determination can be made to pass it down to the next addressed station. In this type of daisy chain, the downstream interface of each secondary station must duplicate a primary station's RS232 interface; that is, it must be intelligent enough to recognize and deal with each of the interface signals and must be capable of buffering the longest message to be sent to any station since, if a given station must monitor incoming messages, it cannot interrupt the incoming message once a determination has been reached that the message is intended for a downstream station.

OBJECT OF THE INVENTION

In view of the foregoing limitations of star configuration and of the normal daisy chain configuration, the excessive complexity in cost invites several improvements. It is desired and is an object of this invention to provide a simpler, more reliable and less costly method of sending data through secondary stations in a chain configuration.

It is a further object of this invention to eliminate the delay associated with buffering and retransmitting of data through a secondary station.

Another object of the invention is to provide control of any modems in the daisy chain directly from the primary station to reduce system costs by having a system that contains only one set of modem control logic.

The foregoing and still other objects that are not specifically enumerated are met in the present invention which will now be described in greater detail with reference to a preferred embodiment which is illustrated in the drawing as follows.

BRIEF DESCRIPTION OF THE DRAWINGS

FIG. 3 is a table demonstrating the protocol utilized between the primary and secondary stations with and without modems in the daisy chain according to the present invention with the primary station initiating transmission.

FIG. 4 illustrates the protocol in tabular form for control of the network in a daisy chain configuration where the secondary station initiates transmission according to the invention.

FIG. 5 illustrates in tabular form the signal crossovers that must be implemented in each secondary station according to the invention.

FIG. 11 illustrates the clocking condition in which the ultimate secondary station in the network provides the clocking for the entire network.

FIG. 12 illustrates the clocking condition in which modems are included in the daisy chain and are upstream of the secondary station or stations and provide the clocking.

FIG. 13 illustrates the clocking condition in which a modem located further downstream than a given secondary station is providing clocking.

FIG. 14 illustrates the situation in which the primary station provides the clocking and the secondary station is not at the end of the daisy chain.

FIG. 15 illustrates the clocking case where the primary station provides clocking and the secondary station is the ultimate station in the network.

FIG. 16 illustrates in tabular form the selection of the clocking case as determined by each secondary station dependent on upstream pins 15 and 17 and downstream pins 15 and 17 and upon the condition of the next downstream station's power off.

FIG. 17 illustrates in tabular form the port assignment and significance of the static RAM memory input and output ports as utilized by the microprocessor in FIG. 8 in controlling the switches and interfaces in FIG. 9.

FIG. 18 illustrates the complete table of possible clocking cases dependent upon the condition of the upstream and downstream pins 15 and 17.

FIG. 19 illustrates in tabular form the secondary station's setting of the static RAM output port B leads to set up and control proper clocking and signal wrapping according to the clock case that has been identified.

SUMMARY

The foregoing and still other objects of the present invention that are not specifically enumerated are met by modifying the secondary stations so that they present to any further downstream stations an extension of the primary station interface to permit the primary station to directly control all of the secondary stations. There are minimal delays in any secondary station and these stations receive on an upstream interface and transmit unchanged on downstream pin interfaces information that allows the downstream interface to look just like a normal DTE type RS232 interface. However, the intelligence controlling that interface is at the primary station where it appears only once in the entire network. Each secondary station therefore includes means for permitting both transmission and reception sides of the station to act as DTE signal source or destination configurations in a standard RS232 or similar standard interface configuration. This requires an internal crossover of signals so that data received as receive data on one side of the station and destined for a more distant station can be outputted on a transmit data line on the downstream side of the same station that has received it and vice versa for the upstream direction. Other crossovers are established for clocking and other signal leads. This permits the standard DTE to DTE point-to-point crossover cable connector to be utilized between the primary station and the first secondary station, the first secondary station and the second secondary station and so forth, until an entire daisy chain network as been assembled. It also allows "straight through" cables to be used when modems are installed in the chain.

DETAILED SPECIFICATION

The invention will now be described in greater detail with reference to a preferred embodiment thereof which utilizes, for example, the standard RS232C interface for purposes of discussion. It will be apparent to those of skill in the art that numerous other standard interface specifications exist and that the present invention, its method and technique and the specific hardware employed may be easily modified to accommodate the slightly different specification of signal lines and pins encountered in various other standard interface specifications without departing from the spirit and scope of the invention.

Figure 1:
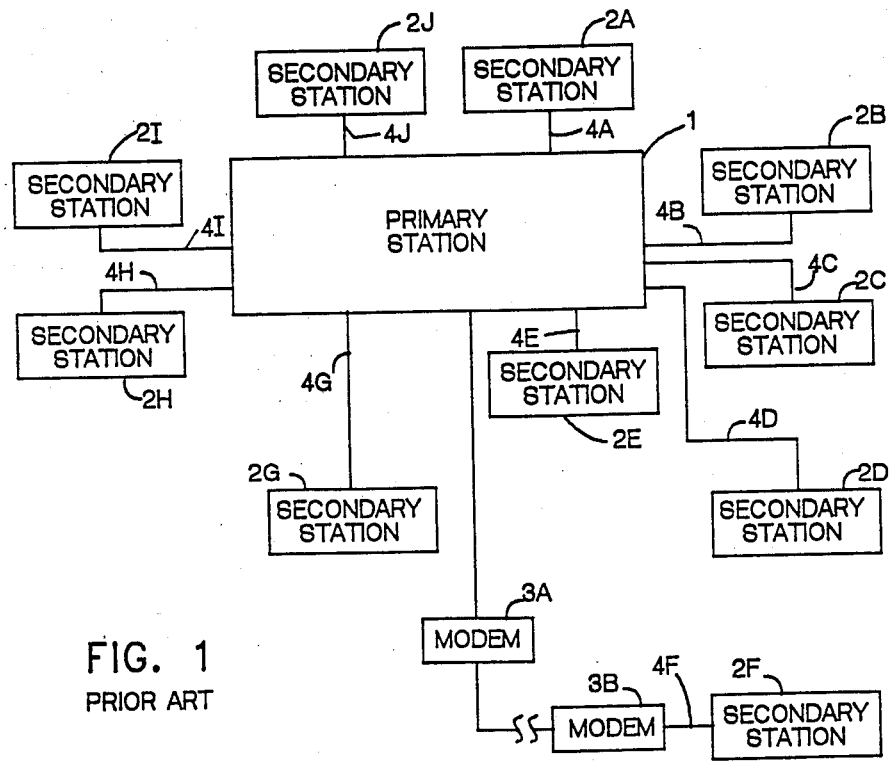
FIG. 1 illustrates schematically a prior art star configuration of a primary station connected with multiple RS232 or similar standard interface ports to a plurality of secondary stations.

Turning to FIG. 1, a brief description of the problem will be made with reference to prior art star configuration. A primary station 1 which may be a communication controller and CPU having a host processor is illustrated. A plurality of secondary stations 2A through 2J are supported, each with its own interface port to the controller or primary station 1. A plurality of crossover or point-to-point DTE to DTE connecting cables 4A through 4J are utilized to connect the ports of the primary station 1 to the standard interface of the secondary stations 2A through 2J. In one situation, modem pair 3A and 3B are illustrated as connected to cable 4F to supply secondary station 2F with a communications link. In this case, additional cable would be required to connect the remote modem 3B with a secondary station 2F. With this configuration, it will be noted that a failure outside the primary station 1 will cut off at most only one secondary station 2A through 2J. However, the number of secondary stations that can be supported is limited to the physical number of ports at the primary station 1. The cost and complexity of a primary station is largely dependent upon the number of ports that are present and unless the user's network fully employs all of the ports of the primary station, some of the extra cost of providing this capability must be borne by the relatively fewer user's stations. In addition, where the secondary stations are located at varying distances from the primary station 1, numerous lengths of relatively expensive cable must be utilized and they must extend all the way from the primary station to each secondary station. It can be easily seen that many more feet of cable will be required to connect a given number of stations even where each secondary station is located the same relative distance from the primary station 1 as all others since the feet of connecting cable are multiplied by the number of stations. If the stations 2 were closer to one another than to the primary station, a great savings in cabling could be realized if the stations could be chained together in a daisy chain configuration.

Figure 2:
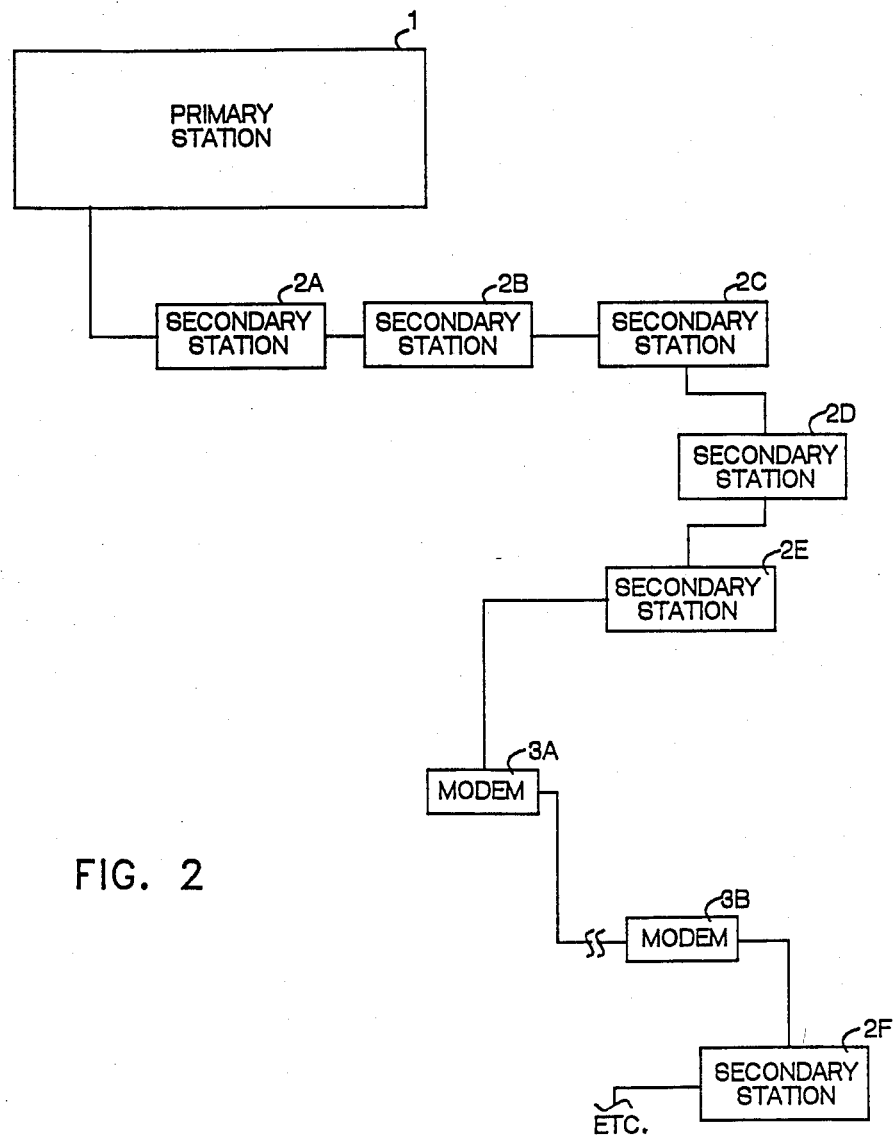
FIG. 2 schematically illustrates a daisy chain network configuration of the present invention.

FIG. 2 illustrates a daisy chain configuration in accordance with the present invention. Such a configuration can be constructed utilizing point-to-point communication network hardware and software in which each secondary station is provided with sufficient intelligence and buffering capability to receive, examine, store if necessary and retransmit when necessary the longest message intended for any station in the system. Each such secondary station 2A through 2F as shown in FIG. 2 must reconstruct a full RS232 interface at its connecting point to the communication link going to the next station. This means that clocking and a full set of protocol hardware for establishing the RTS/CTS handshake, for example, must be provided at each station.

This configuration increases the complexity and cost but is so far the standard type of daisy chain configuration. A simpler and more reliable less expensive method of sending data through each secondary station to the ultimate destination is desired. Elimination of the delay associated with buffering and retransmitting the data through each secondary station is also sought. In addition, control of any modems such as 3A, 3B in the daisy chain of FIG. 2 directly from the primary station 1 would be a great advantage since modem control logic is an expensive part of the system and is multiplied unless some means of allowing the primary station to provide the control is made.

It has been discovered that by providing at each secondary station a relatively simple microprocessor and static memory together with a limited amount of controllable interconnecting switch logic, it is possible to establish a source of unambiguous clocking in a daisy chain configuration utilizing standard RS232 interfaces and connector cables without involving each secondary station in a buffering and data examining routine. This eliminates a great deal of cost and complexity and many of the sources of error and failure since each secondary station then acts as an individual station in a multipoint network and its failure does not affect the operation of many other stations in the chain in most instances. This is a significant advantage since relatively simple interfaces such as RS232C may be employed and commonly available crossover interconnection cables can be utilized from unit to unit to construct the chain. The entire network can be controlled from the primary station 1 in FIG. 2 and control of any modems such as 3A and 3B is solely under control of station 1. Each secondary station 2A through 2F in FIG. 2 acts as a multipoint monitoring station, but each station is capable of originating data for transmission and placing it on the communication link that forms the daisy chain.

FIG. 2 might be redrawn to more aptly represent the present invention by drawing a single communication link with multidrop or multipoint connections serving each secondary station. However, FIG. 2 has been drawn in its present configuration because of the method of actually constructing it, i.e., each station is connected to the next downstream station or upstream station by a length of crossover interconnection cable of the standard type. Thus, the network is literally strung together from station to station in a daisy chain although its logical and electronic function is of a multipoint control nature.

The invention will now be described with reference to a preferred embodiment and will begin with an illustration of the transmission and reception protocols for the primary station initiating transmission and for the secondary station initiating transmission.

Turning to FIG. 3, a tabular representation for the primary station initiating transmission under two conditions where there are no modems in the daisy chain and when there are modems present in the daisy chain is shown. It will be observed that the primary station begins transmission by raising the standard interface pin that is assigned the data terminal ready, abbreviated DTR significance. This signal propagates down the chain through the interconnecting links and, if no modem is present in the chain, will be wrapped back by the last secondary station in the chain to return to the primary station as its handshake response data set ready, abbreviated DSR.

When the primary station receives DSR, it raises the request to send lead, abbreviated RTS, which again propagates down the daisy chain and is wrapped back by the ultimate secondary station assuming that no modems are present and returns to the primary as the clear to send, abbreviated CTS. When the primary station receives CTS, it initiates sending data which propagates down the chain to the last station. The data is seen by all intervening stations and that station which may be addressed by the primary station will respond.

A different operation occurs if modems are present in the daisy chain. Modems normally provide the source of clocking and hence, are responsible also for initiating the data set ready (DSR) signal among others. The protocol is slightly different as shown in FIG. 3 and instead of the last station 2 wrapping back the DTR and RTS signals, the modem initiates its normal data set ready (DSR) and the modem initiates its normal CTS in response to the receipt of RTS. In each case, however, it will be necessary for all of the secondary stations to determine what the proper source of clocking will be and to have a method of establishing clocking when clocking is not received from either modem or primary station. This will be described in greater detail below.

FIG. 4 illustrates in tabular form the protocol for establishing communication when the secondary station initiates transmission or wants to respond to the primary. The secondary station first raises the request to send signal RTS which is propagated on up the daisy chain to the primary station where it is connected to the carrier detect (CD) pin and conditions the primary to receive data. At some time, the primary station raises the data terminal ready signal DTR which propagates back down the daisy chain as connected to each secondary's clear to send CTS pin. When the secondary station receives the CTS signal, it initiates sending out data. This example is for the case when no modems are present in the daisy chain. The other alternative is also shown in FIG. 4 in which modems are present in the chain. In this case, when the modem receives the RTS signal from a secondary station located downstream from it, the modem gives back the clear to send signal CTS which passes down the daisy chain to the secondary station. Data then propagates up the chain through the modems to the primary station.

The daisy chain in FIG. 2 for present invention supports four types of interconnection topologies. First, there can be direct cable connection between the primary station and a secondary station in a single point-to-point configuration. Secondly, connection of a leased line modem, i.e., non-switched modem to the primary station and/or to a secondary station can be supported. Thirdly, connection of a switch network modem to the primary and/or to a secondary station is supported. Finally, direct cable interconnection of two or more secondary stations such as that illustrated in FIG. 2 is also supported. The secondary stations must adapt themselves automatically to the connections used and a self-learning process is involved as will be described in some greater detail later.

Data and signals moving up and down the daisy chain are not interrupted as they pass through each station 2 on the chain. However, since each station presents a physical RS232 interface and since standard crossover cables are utilized for interconnecting the units, an internal crossover must be provided at each station to properly propagate signals received from either upstream or downstream to the appropriate downstream or upstream pin to take account of the fact that from that point, yet another crossover cable will connect the signals to the next unit. This also makes each interface familiar to service personnel.

FIG. 5 illustrates in tabular form the pairing of upstream and downstream pins together with the signals which they serve. Some of the signals in FIG. 5 are sensed directly by a micro controller chip while many more are sensed by the static RAM logic peripheral I/O chip which can be read by the micro controller as required. Some of the signals in FIG. 5 illustrate that two different signals may be carried by an individual pin or pins. The reason for this is that when modems are present in the chain, the signals change location and designation. For example, in FIG. 5 upstream pin 8 may be receiving the request to send signal RTS from a primary station 1 if there are no modems in the daisy chain between the primary station and the secondary station of interest. However, if there are modems somewhere in the chain between the primary unit and the secondary unit, then the signal on pin 8 will be the carrier detect signal CD coming from the modem. Thus, the true meaning of pin 8 is that when it is inactive, there is no valid data coming in on the upstream interface on pin 3. This does not change if modems are or are not present in the chain so no special logic is required in secondary stations to deal with the presence or absence of modems except for the clocking which must be explained in greater detail. This will be done later.

The clocking to be established must flow through all of the secondary stations to the primary station because the primary station may not be able to originate clocks. Four wires are utilized in the RS232 example in the daisy chain constructed for the network in this example. All four wires are not utilized if the daisy chain is asynchronous but they do no harm by being present. When synchronous communication is employed as in the present example, then the clocking is necessary.

Figure 6:
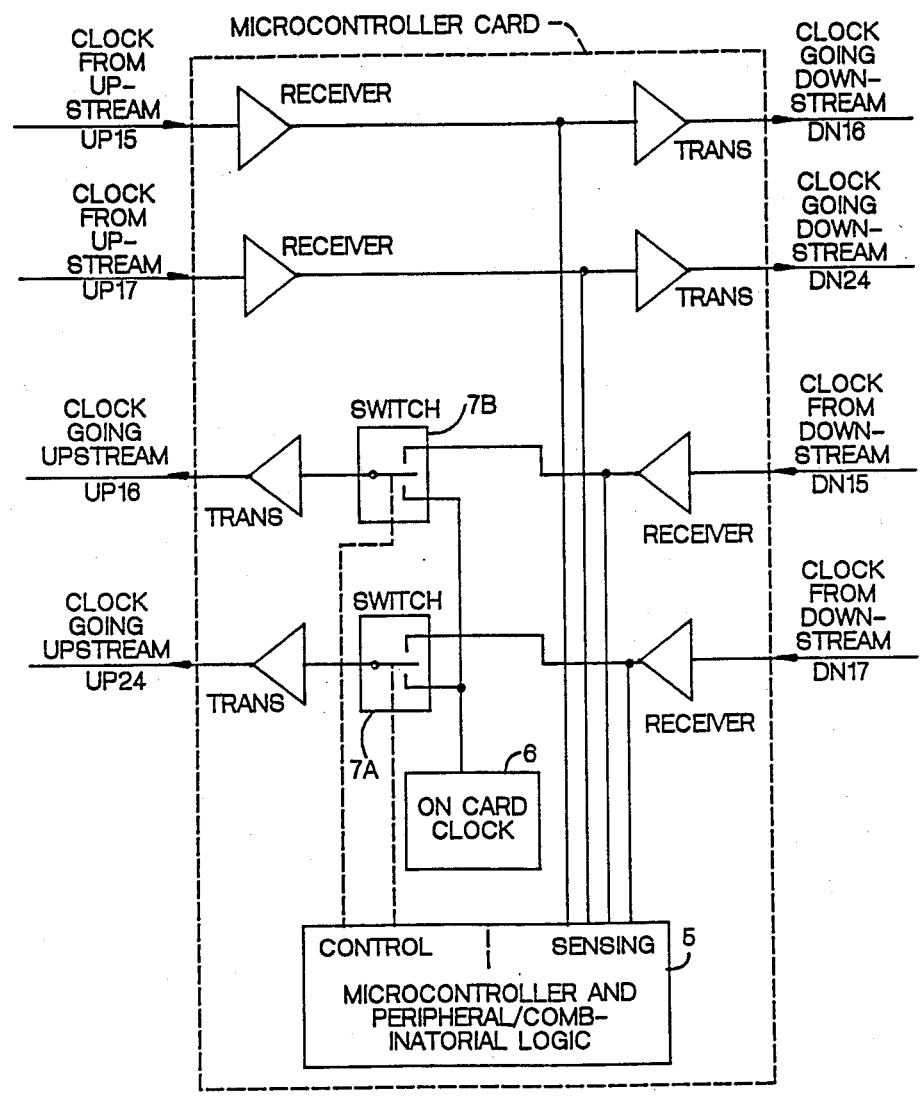
FIG. 6 schematically illustrates the control logic and microprocessor together with necessary switching circuitry and sensing capability for utilization at each secondary station according to the invention.

FIG. 6 illustrates the four clock connections that pass through each secondary station. The clocking leads do not change names as the topology of the daisy chain may be changed but the selection of which two clocking leads are employed varies. For example, when synchronous modems are in use as in the present example, they always produce clocking signals. Thus, if there are synchronous modems in the daisy chain above a secondary station as shown in FIG. 6, the two top paths, pins 15 and 17, will be in use and the bottom pair of paths from the downstream to upstream side will be idle. The reverse will be true if the modems happen to be below the station in interest.

In FIG. 6, a micro controller is provided with input leads to sense the condition of clocks passing from downstream to upstream and upstream to downstream. Control leads go from the micro controller 5 to control switches 7 to allow for either application of clocking by the station micro controller 5 utilizing its own card clock 6 or to utilize clocking coming from downstream for propagation on upstream. This will be described in some greater detail below.

In the configuration shown, the daisy chain network can have only a single primary station at the top end or upstream end for example. It may have many "last" secondary stations if there are multipoint modems in the chain or it may have only a single last secondary station if there are only point-to-point modems or no modems at all in the chain. The two cases are functionally equivalent because the modems will provide clocks in any situation where there are N potential last secondary stations present.

A single secondary station must be selected unambiguously to account for clock origination when no other unit is originating clocks and to provide the status signal wraps necessary to the primary station. Since the secondary stations in this invention do not contain data buffers, only a single entity in the daisy chain network can be allowed to generate clocks. The entity that generates clocks is usually a paired set of modems where modems are present. However, the primary station can possibly generate clocks since it is a unique station in the chain. Also, the last station in the chain is another unique possibility. With the design approach of the present invention, if the primary station generates the clock, then the last station in the chain will not generate the clocks. However, if the primary station does not generate clocks and there are no modems to generate clocks, then the last secondary station in the network will generate clocking. This provides a unique capability to add or subtract stations from the chain without interfering with the establishment of clocking. It also permits easy substitution of one type of modem for another and simplifies the design of the primary station since the primary station does not have to be modified to accommodate the possible changes.

It therefore only becomes necessary to determine which the last secondary station may be in the event that modems are not present and are not providing clocking or when a primary station is not providing clocking. The last station 2 can easily and inexpensively determine that it is the last station by checking the downstream interface for the presence of 0 volts, an illegal RS232 level, on the downstream pin DN03. If any legitimate non-zero RS232 level is present on downstream pin DN03, then the secondary station in question is not the last station in the chain.

Designating a unique secondary station also facilitates originating the CTS and DSR signals. When a primary station raises request to send (RTS), it will wait for the receipt of CTS. If no modems are present in the daisy chain, one or more of the secondary stations must originate CTS. In the design according to the present invention, the ultimate secondary station in the chain will originate CTS by wrapping the RTS signal from the primary back upstream to the primary station. The DTR signal is wrapped back by the final station to become the DSR signal for the primary station. The rate select signal RS is wrapped back using the ring indicate RI lead. The RS/RI wrapping is not critical to the function of the daisy chain but is installed with spare logic to facilitate testing.

Figure 7:
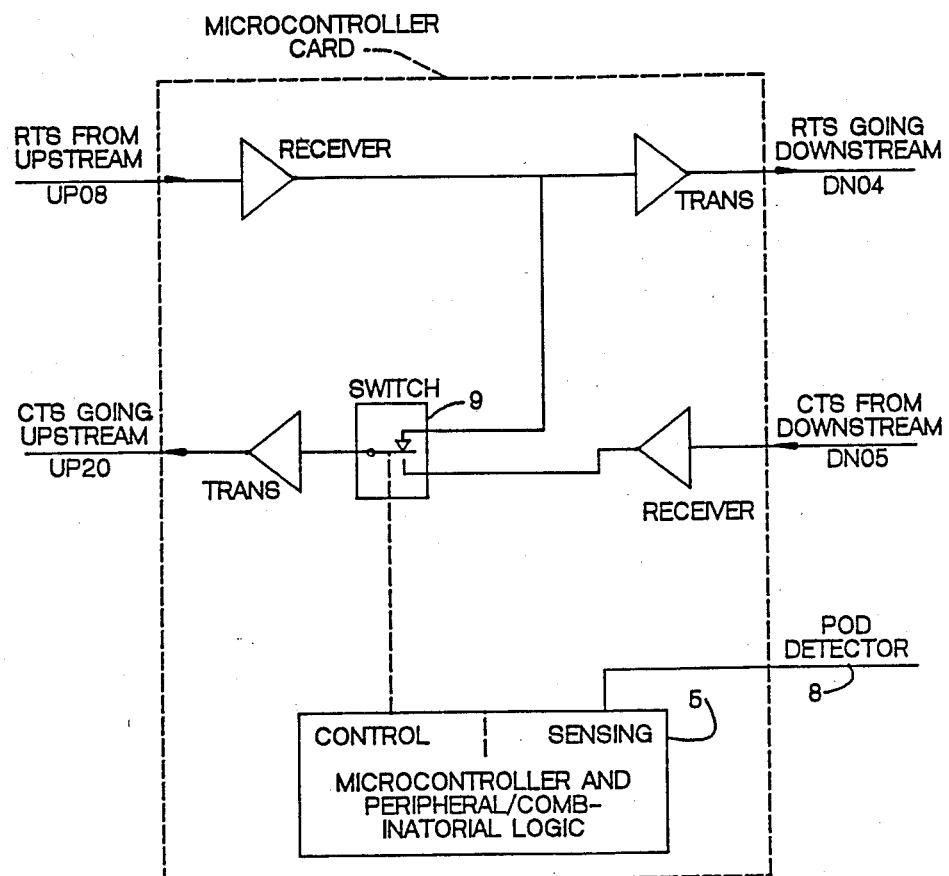
FIG. 7 schematically illustrates the facility for wrap back at a secondary station which will provide clocking when there are no modems in the daisy chain and the primary station is not providing clocking.

FIG. 7 illustrates schematically the example in which a given station 2 happens to be the last station in the chain and the primary station requires the status signal responses just mentioned. The power-on detector 8 will be sensed by the microprocessor 5 to control a switch 9 that gates the incoming RTS signal from upstream pin 8 into an RS232 transmitter for transmission on upstream pin 20 back to the primary as CTS as shown in FIG. 7. A zero voltage level on lead 8 indicates that there is no further station downstream from the station in question. The switches utilized may be standard 74HC257's.

Figure 9:
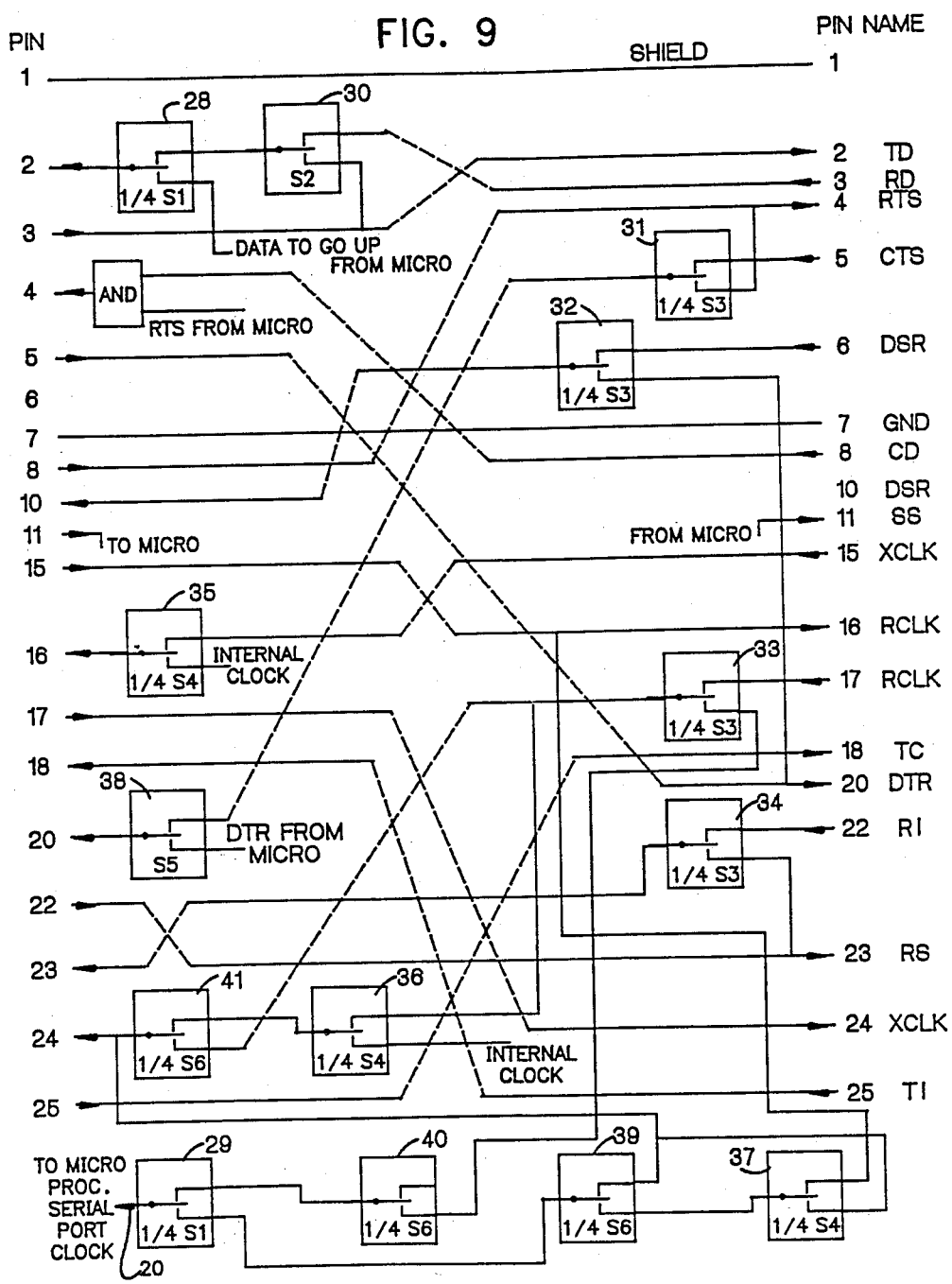
FIG. 9 illustrates the internal crossovers and switching controls which are operated by the microprocessor at each station according to the present invention.

The internal crossovers that must be present in each station 2 are illustrated in full detail in FIG. 9. Numerous switches which may be the 74HC257 type are employed to facilitate the switching. The switches 7A and 7B from FIG. 6 are embodied in FIG. 9 as switch 35 to facilitate the crossover between downstream line 15 and upstream line 16 and as the switches 33 and 36 and 41 to facilitate the crossover between downstream line 17 and upstream line 24 and for the application of the internal clock signal when desired in the event that the station must provide clocking.

The switches utilized in FIG. 9 are embodied in multiswitch packages with four independent switch units per module. While the individual switch elements are given individual numbers such as 31, 32, 33, 34, etc., they are also numbered as being a portion of a switch S1, S2, S3, etc., to indicate in which portion of a controlled switch module they reside. The control lines to the individual switches are not shown in FIG. 9 for simplicity. They are controlled by the micro controller 5 which causes the issuance of control signals from a communications port on the static RAM chip that will be described in greater detail below.

Figure 8:
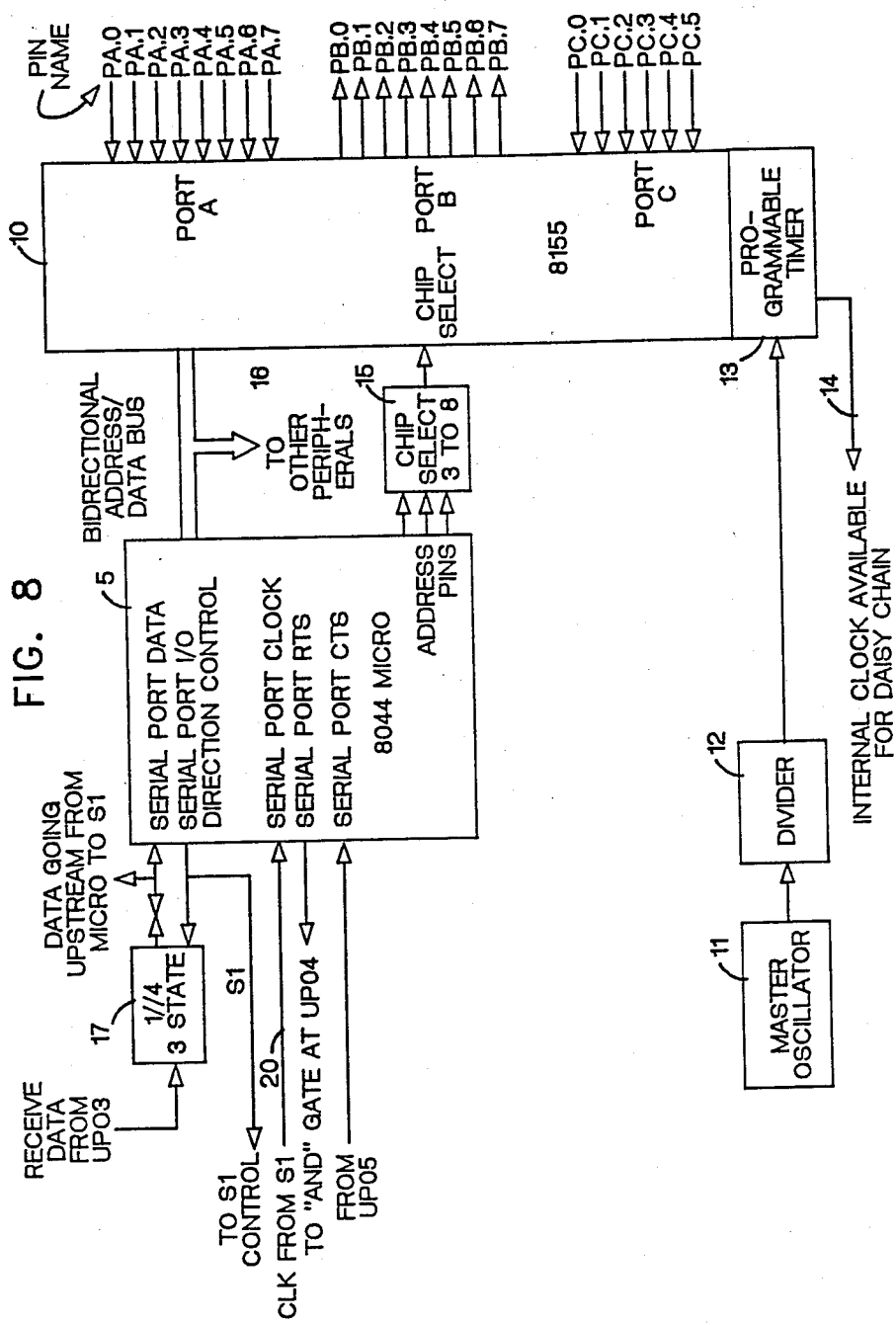
FIG. 8 schematically illustrates the micro controller and static RAM chips together wth the on-card clock oscillator and divider as used in the present invention.

The micro controller connections to the daisy chain are illustrated in FIG. 8. In FIG. 8, it will be observed that some control signals are monitored directly by the microprocessor 5 while the majority of signals are monitored by input ports to the static RAM and logic chip 10. This is a standard Intel 8155 HMOS RAM with I/O ports and timer as utilized in the present embodiment. The microprocessor is an Intel standard 8044 microprocessor. Microprocessor 5 receives data from the upstream pin 3. The receive data lead from upstream and, depending upon whether the station 2 served by the microprocessor is receiving or transmitting, a three-state control gate 17 is controlled by the microprocessor 5 to permit either the reception of data from upstream or the generation of data going upstream for application through switch 28 in FIG. 9 to the transmit data lead 2 therein. Control for the switch 28 is shown as the S1 control line in FIG. 8 emanating from the microprocessor 5. Other controls and signals sensed directly by the processor 5 are also shown.

A master oscillator 11 is counted down by the divider circuit 12 to run a programmable timer 13 which is part of the standard 8155 chip. This results in generating an internal clock that is available for use on the daisy chain on lead 14 and for use by the microprocessor in the event that clocking is not being provided from upstream or downstream. Clocking from up or downstream is supplied over line 20 to the processor 5 in FIG. 8 from a variety of switches 29, 40, 39, 37 that culminate in the output line 20 in FIG. 9. The switches that ultimately result in the output on line 20 monitor the clocking on various upstream and downstream lines for the four possible clock lines present. Either the internal clocks or the external clocks received at the upstream or downstream ports will eventually be selected and supplied through the stream of selection gates to result in a final clock on line 20. The selection of clocking will become more apparent as the discussion progresses.

Continuing with FIG. 8, microprocessor 5 utilizes its output address pins to the chip select logic 15 to select which port A, B or C of the 8155 chip 10 will be read or written. A bidirectional data bus 16 provides the facility for reading or writing to the ports and any other peripheral devices by the processor 5.

Returning to FIG. 9 now, and keeping FIG. 8 in view, the control of the various switches as modular units designated S1, S2, etc., through S6 will be discussed.

S1, which comprises switchs 28 and 29 in FIG. 9, is controlled by the microprocessor 5 utilizing its serial I/O pin is shown as the S1 control in FIG. 8. The control line connections to switches 28 and 29 are not shown for sake of clarity.

S2 comprising switch 30 is controlled by the microprocessor 5 when it is triggered by the condition of the upstream pin 11 during diagnostics as will be discussed in greater detail later. S2 performs a data wrap.

S3 performs the control signal wrap function and is controlled by both the microcontroller and by an upstream station through pin 11. S3 comprising switches 31, 32, 33 and 34 is controlled by an upstream station through pin 11 as interpreted by the microprocessor 5 through control signals issued from port B, pin 7 in the 8155 chip 10 of FIG. 8. The connection of the port B, line 7 signals to the elements of switch 31 through 34 are not shown.

Switch S4 comprising switches 35, 36 and 37 is controlled by the microprocessor 5 through its direction of the 8155 chip 10 at port B, pin 5.

Switch S5 comprising switch module 38 is controlled by the microprocessor utilizing port B, pin 4 in the 8155 chip. Again, the control lead interconnection between port B, pin 4 and switch 38 is not shown for sake of clarity. S5 helps provide control of the DTR signal and can be used for force a switched network modem to hang up.

Switch S6 comprising switches 39, 40 and 41 is controlled by the microprocessor 5 to its connection to the 8155 chip, port B1 output. S6 is used to control and/or select clocks.

Daisy chain control signals for the daisy chain pins are sensed by the micro controller 5 utilizing its own inputs as shown in FIG. 8 and some of the inputs from port A and port C on the 8155 chip as will be described in greater detail below.

Figure 10:
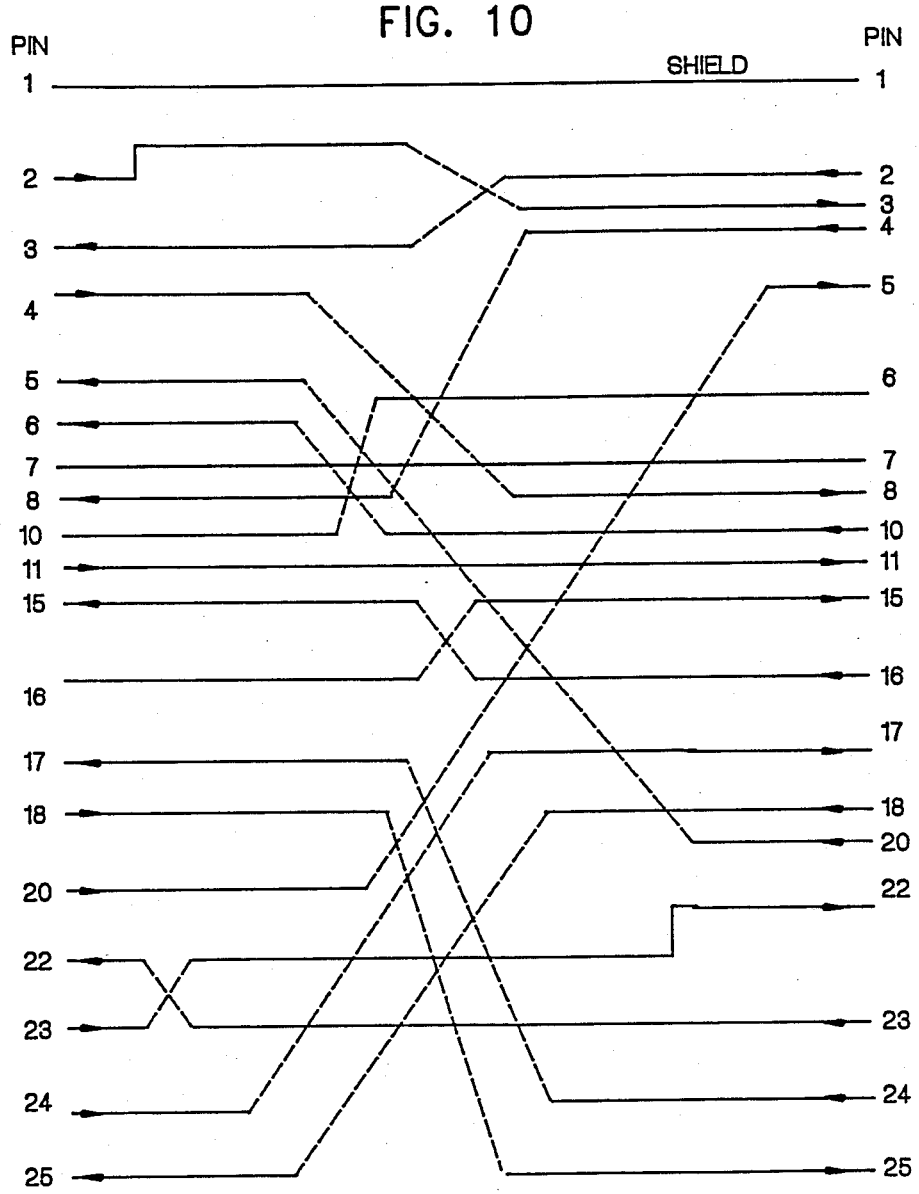
FIG. 10 illustrates the typical schematic of a point-to-point DTE to DTE crossover connecting cable for connecting two RS232C devices together in a point-to-point configuration.

Turning now to FIG. 10, a brief schematic of a typical DTE to DTE crossover interconnection cable is shown. Such a cable has a male connector at one end and a female receptacle at the other with various pins and sockets interconnected in the crossover configuration as schematically shown in FIG. 10. Similar standard connector cables are utilized for connecting DTEs to DTEs in numerous situations of point-to-point communication. Utilization of these cables to construct a multipoint system is extremely advantageous but requires the aforementioned modification of each station to accommodate the appropriate recrossing of the signal pairs as necessary.

Returning now to the clocking situation, it is apparent that one and only one pair of clock signals can be present on a daisy chain at a given time. One clock signal is used for clocking data into the primary station 1. The other clock is used for clocking data out of the primary station. Five possible clocking arrangements are allowed to exist in the daisy chain configuration of the present invention. Each secondary station in the chain supports all five possible clocking cases automatically. In a typical daisy chain configuration with multiple stations, different secondary stations will perceive different clocking arrangements, depending upon their physical location in the chain or network.

Clocking case 1 is schematically illustrated in FIG. 11. In this case, when no other entity in a daisy chain is providing clocks, that secondary station which determines that it is the last station in the chain will emit a square wave clock on upstream interface pins 16 and 24. If the secondary station does not detect an acceptable set of clock signals coming from some external source, it will assume that it should send clocks upstream even when it is not the last station present in the chain. However, this scenario of a secondary that is not the last station present originating clocks is an abnormal situation that indicates a failure somewhere downstream in the daisy chain below the unit that is producing the clocks. In FIG. 11 the secondary station is supplying clocks on its upstream pins 16 and 24 for clocking data out of the primary station on the transmit data pin 2 and for clocking data into the primary station on the receive data pin 3. The transmit and receive clocks are connected to pin 15 and 17 respectively at the primary station utilizing the crossover cable connection as schematically shown by the crossover cable in FIG. 10. Similarly, the clock on pin 24 from the secondary station goes to pin 17 at the primary station by means of the crossover cable connection. Intermediate stations on the daisy chain are not shown.

FIG. 12 illustrates a second case of clocking when a unit upstream from a secondary station in question is providing a pair of clock signals. In this condition, the secondary station must use the clock signals provided to clock data into and out of itself and must also pass these clock signals on down the chain to any other entity.

FIG. 13 schematically shows the third clocking case in which a unit downstream from a secondary station is providing an acceptable pair of clock signals. Under this circumstance, the secondary station must use the clock for clocking data into and out of itself and must also pass the clock signals upstream to the primary station.

FIG. 14 illustrates the fourth clocking condition in which the primary station provides the clocking and the secondary station is not at the end or is not the last secondary station in the chain. In the prior three cases, clock and data propagated in opposite directions along the daisy chain. This limits the number of entities that can be in the chain because of the compounded phase shift of different clocks and data directions. This problem may be overcome in the case 4 and case 5 to be discussed if the clock used with each data wire propagates along the daisy chain in the same direction as the data it controls. This removes clock phase discrepancies from the list of factors that limit the length of the daisy chain configuration. This is called in-phase clocking and can be done only if the primary station generates a clock signal. FIG. 14 illustrates one such circumstance in which the secondary unit is not at the end of the daisy chain.

FIG. 15 illustrates the fifth clocking condition in which the transmit clock originates at the primary station and propagates down the daisy chain with the transmitted data. The secondary station that is the last station in the chain will take the incoming clock from pin 17 and wrap it to pin 24 to be used as the clock to transmit data back up the chain. This is a split clocking case but fulfills the requirement of having the clocking propagate in the same direction as the data which it controls.

As was noted earlier, it is essential that each secondary station when turned on be able to determine what clocking condition is present. This implies a self-learning mode that is to be followed upon reset and periodically during normal operation at each station. The station's microprocessor monitors the daisy chain clocks on the upstream pins 15, 17 and downstream pins 15 and 17. When a given secondary station knows which of the four clock pins has an active clock, it deduces which type of clocking is being done in the daisy chain as it is presently configured and adapts itself to that type of clocking. This capability allows any individual to add or remove modems and secondary stations from the daisy chain without locating and changing any configuration switches. The basic requirement is that when modems are present in the daisy chain, they must provide clocking. If there are no modems in the daisy chain, then only one entity in the daisy chain network can provide clocks and that will be the entity farthest from the primary station. This scheme accommodates the clocking cases depicted in FIGS. 11, 12 and 13 as described above. Cases 4 and 5 have been added to accommodate the concept of split clocking with the primary station generating one clock and a secondary station originating the other. The table in FIG. 16 illustrates how the choices are made by any secondary station during the self-learning mode. When all signals are normal, i.e., the clock "case" is clear and unambiguous.

As illustrated in FIG. 16, the clocking case conditions that can occur on a daisy chain may be represented by the condition of the upstream and downstream pins 15 and 17 and by the condition of whether any secondary station is last, i.e, if the power off detector line 8 in FIG. 7 has a zero volt level as sensed by the microprocessor 5.

FIG. 18 illustrates the full (legal and illegal) set of all possible clocking conditions and the clocking case that results dependent upon the upstream and downstream pins 15 and 17 clock conditions. Once the external clocking conditions have been checked by the processor and the correct clocking case has been determined, then a secondary station uses pins at port B1, B5 and B7 to control the switches and set up the hardware on the micro controller card described in FIG. 9 to establish the correct clocking and to establish the proper signal wrapping. The table in FIG. 19 illustrates the choice of combinations based upon the determination of the clocking case, the downstream power off detection and the condition of upstream pins 11 and 25 and the outputs selected by the microprocessor through the port B, pins 1, 5 and 7. The results illustrate the application of clocking on upstream pins 16 and 24 or downstream pins 15 and 17 and the source of clocking for the 8044 microprocessor in the receive mode and in the transmit mode. The I under the pins 16 and 24 indicates that internal clock is used. D15 or D17 indicate that downstream pins 15 and 17 are designated and U designations are upstream pins.

As illustrated in greater detail in FIG. 17, the specific preferred embodiment utilizes an Intel 8155 static logic and RAM chip. The 8155 chip 10 as illustrated in FIG. 8 has three general purpose I/O ports A, B and C, a timer and 256 bytes of RAM available. In the secondary station, one I/O port of this chip is used as an input port to sense daisy chain signals. Another I/O port is used as an output port to control the daisy chain control switches and the third I/O port is used as an input to allow the microprocessor 5 to sense various signals on the card. The timer may be used to provide a clock for the daisy chain as needed. The address assignment and the name of the port or element controlled by them and the description are all listed in the tabular form of FIG. 17.

Problem Diagnosis.

An important aspect of the present invention is the answer to the problem of fault diagnosis. In a daisy chain configuration, when the primary station raises RTS and never receives the expected CTS signal, there is no way to analyze where in the daisy chain the failure may have occurred without additional information being available beyond the simple fact that no CTS signal has been received. The technique used in the present invention is to have one wire in the daisy chain interface, which does not automatically propagate down through the daisy chain, be utilized for diagnostic purposes. The wire selected is the upstream pin 11 and downstream pin 11 at each station. The signal on pin 11 is one that originates at the primary station or at any secondary station's downstream side but goes only to the next entity in the daisy chain below the originating entity. The use of pin 11 is described as follows.

Suppose there are five secondary stations in the chain and that the number 3 station is broken with number 1 being closest to the primary station. A primary station will raise request to send RTS but will never receive clear to send CTS because secondary station 3 is not passing the request to send signal to number 4 to eventually be wrapped back as the clear to send CTS signal. After arbitrary timeout has occurred, the primary station will determine that no CTS signal is being received and will originate a diagnostic process to eventually determine which station is the source of the problem. An example of the diagnostic procedure follows.

The primary station, having determined that clear to send CTS has not been received, will raise the signal on its own pin 11. This propagates only to the first station 1 next downstream from the primary station. Secondary station 1 will receive the signal and put itself in the artificially induced last station mode which is controlled by pin 11 as pointed out earlier. This means that station 1 will consider itself artificially to be the last station 2 on the daisy chain and will cause it to activate the wrap conditions and generate clocking for the chain as if there were not already perfectly acceptable clock signals present.

The primary station will maintain pin 11 active and attempt to communicate with the secondary station 1 by sending a command to raise pin 11 to the secondary station 1. For the scenario thus described, secondary station 1 is operating normally and will thus receive the addressed message from the primary station that it should raise its pin 11 and will execute the command and send an acknowledgment back to the primary station. Thus, secondary station numbers 1 and 2 will both detect that pin 11 is active under upstream interfaces at this point.

When the primary station receives acknowledgment from secondary station 1 that it has activated its downstream pin 11, the primary station will deactivate its downstream pin 11 and record the fact that station 1 is not the location of the fault.

The primary station will next attempt to send a raise pin 11 command to station number 2 to cause it to act artificially as the last secondary station in the chain. This is possible because secondary station number 1 is holding its downstream pin 11 raised in response to the previous command from the primary station. Under the assumptions of the present problem, this attempt will be possible and the primary station will record that the problem is not at station number 2. Primary station 1 will then send a deactivate pin 11 command to secondary station 1.

At this point, the only active pin 11 wire will be the one active between secondary stations 2 and 3. The primary station will next attempt to send the raise pin 11 command to secondary station number 3 and cause it to assume the last station mode. In the assumption present that station 3 is at fault, this attempt will be unsuccessful since station 3 is not receiving or is not transmitting. The primary station can now conclude that the failure in the daisy chain is either in station number 3 or in the cable connecting station 2 to station 3.

Under these conditions, the primary station cannot communicate with any of the secondary stations beyond station 2 and, since it has never received the clear to send signal CTS, it cannot communicate in normal mode with either stations 1 or 2. The primary station then must start the process over by raising its pin 11 active and will stop the process with pin 11 active between secondary stations 1 and 2. This results in artificially placing station 2 in the last station mode. In order to determine whether the cable or the station number 3 is at fault, the primary station will send a "report daisy chain interface status" command to the secondary station 2. The results of the status which are listed active and inactive downstream interface leads and the status of the downstream power-off detection circuit may permit the primary station to distinguish between a cable failure and a station 3 failure.

At this point, the diagnostic effort is complete as far as primary station 1 can pursue it and stations 1 and 2 are available for normal use. Secondary stations 3, 4 and 5 cannot be used by the primary station.

It will be evident that if secondary stations are likely to fail excessively, they could be constructed with bypass relays that could route the daisy chain signals around the failing station. This, of course, will not alleviate problems with break or failure in the interconnecting cable.

Having thus described my invention with reference to a preferred embodiment thereof illustrated using an RS232 interface for example, it will be apparent to those of skill in the art that other standard interfaces may similarly be employed utilizing the same techniques and general apparatus. Therefore, what is described in the following claims is intended by way of description and not limitation.

What is claimed is:

1. A method of providing a chained multipoint communications network utilizing plural point-to-point interface hardware devices, comprising steps of:
   receiving at a first communications device at an upstream or downstream standard communications interface port a plurality of control and data signals on specified standard number communication interface pins; and
   issuing on downstream or upstream standard communication interface ports said plurality of control and data signals from said upstream or downstream ports, respectively, and;
   said signals being issued on differently numbered standard communication interface port signal pins than those on which they were received so that they may be received correctly on the same numbered pins as said first device at the next device in said chain which is connected to said communication ports of said first device with a standard crossover connection cable.

2. A method as described in claim 1, wherein:
   said issuing step comprises steps at each said device of connecting the received data input lead at one standard interface port to the transmit data output lead at the other standard interface port of each device.

3. A multipoint communication network comprising:
   a plurality of point-to-point standard communication interface communications devices;
   a plurality of standard communications crossover connecting cables;

said cables connecting the outputs of a standard communication port of one device to the inputs of a standard communication port of another device to construct a multipoint communications network; and each said device comprising crossover means to connect data received from a said cable at a said standard communications interface input port receive data pin to a standard interface port transmit data pin at a standard communications interface output port thereof.

4. Apparatus as described in claim 3, wherein:

said crossover means comprises a microprocessor connected to the input and output standard communication interface ports of each communications device for monitoring the activity at said port; and means controlled by said microprocessor in response to said monitored activity for interconnecting certain of the pins of said standard communications interface input port to certain other pins of a standard communications interface output port in a paired arrangement, said certain pins at least comprising the receive data input pin at a standard communications input port and the transmit data pin at a standard communications output port as one said pair.

5. Apparatus as described in claim 4, wherein:

the roles of input and output port designations reverse when the flow of communication reverses from downstream to upstream or vice versa but the pairing of said interconnections remains unchanged.

6. A method of coordinating communications from a primary or controlling station on a serially chained network of devices that each have a standard interface, said primary or controlling station being located at one end of said serially chain network, comprising steps of:

raising a first signal at said primary station on said serially chained network, said signal being directly connected to the first non-primary station;

transmitting said first signal from said first non-primary station to the next non-primary station and from that said next station to the next station until either a modem or the last station in said network is reached;

returning a second signal from said modem or said last secondary station, whichever is first reached by said first signal, said returned signal being returned to the next station closer to said primary station than said modem or said last station; and passing said second signal from said next station to the next until said primary station receives said second signal; and raising a third signal at said primary station in response to the receipt of said second signal;

said third signal being directly connected to said first non-primary station;

transmitting said third signal from said first non-primary station to the next said station and from the next said station to the next until either a modem or the last said station in said network is reached; and returning a fourth signal from said modem or said last secondary station, whichever is first reached by said third signal, to the station next closer to said primary station or modem than said modem or last station; and passing said fourth signal from said next station to the next until said primary station receives said fourth signal; and transmitting data from said primary station to said network upon receipt of said fourth signal.

7. A method as described in claim 6, wherein said coordinating of communications is from a non-controlling station to said primary or controlling station, comprising steps of:

initiating said third signal at said non-controlling station having data to transmit, said signal being directly connected to said station next closer to said primary station on said network than said non-controlling station;

transmitting said third signal from said next station to the next until a modem or said primary station receives it; and raising said fourth signal at said modem or at said primary station, whichever is first reached by said third signal; and transmitting said fourth signal to said non-controlling station and, upon receipt thereof at said non-controlling station, sending data therefrom.

* * * * *